United States Patent [19]

Ando et al.

[11] Patent Number: 4,719,269

[45] Date of Patent: Jan. 12, 1988

[54] EPOXY RESIN COMPOSITION

[75] Inventors: Toshiharu Ando; Kazuo Yasuda; Yoshifumi Itabashi; Masaru Tsuchihashi, all of Hyogo, Japan

[73] Assignee: Mitsubishi Denki Kabushiki Kaisha, Tokyo, Japan

[21] Appl. No.: 855,389

[22] Filed: Apr. 24, 1986

[30] Foreign Application Priority Data

Jun. 12, 1985 [JP] Japan .................................. 60-127462

[51] Int. Cl.$^4$ ......................... C08G 59/04; C08K 3/10; C08K 3/22; C08K 3/36
[52] U.S. Cl. .................................... 525/524; 525/533; 525/930; 524/457; 524/466
[58] Field of Search ......................... 525/524, 533, 930

[56] References Cited

U.S. PATENT DOCUMENTS

| | | | |
|---|---|---|---|
| 3,704,268 | 11/1972 | Wynstra et al. | 525/533 |
| 3,873,637 | 3/1975 | Fujiwara et al. | 525/524 |
| 4,026,862 | 5/1977 | Smith et al. | 525/533 |
| 4,212,960 | 7/1980 | Hayashi et al. | 525/524 |
| 4,255,553 | 3/1981 | Mizumura | 525/533 |

FOREIGN PATENT DOCUMENTS 0666920  7/1963  Canada ................................. 525/533

Primary Examiner—John C. Bleutge
Assistant Examiner—Robert E. L. Sellers, II
Attorney, Agent, or Firm—Wolf, Greenfield & Sacks

[57] ABSTRACT

A novel epoxy resin composition is comprised of a mixture of a cyclic epoxide type epoxy resin having an epoxy equivalent of 200 or below and a phenoxy resin having a molecular weight of approximately 30,000, a curing agent, and an inorganic filler. This resin composition is useful in the fabrication of cast insulators to be employed in electric machines.

3 Claims, 1 Drawing Figure

EPOXY RESIN COMPOSITION

BACKGROUND OF THE INVENTION

The present invention relates to an epoxy resin composition useful in the making of cast insulators employed in electric machines.

An expoxy resin combined with an acid anhydride cures to provide a product that has superior electrical, mechanical and chemical properties and which is extensively used as an epoxy resin cast insulator in electric machines including those employed in power transmission and distribution. If particularly good electrical and mechanical properties (e.g. high heat resistance) are required, cycloaliphatic epoxy resins having two or more epoxy groups in the molecule are used either alone or in combination with bisphenol A type epoxy resins. In order to improve the productivity of epoxy resin cast insulators using a smaller number of molds, a method commonly referred to as the superatmospheric gelling process which is capable of reducing the release time is currently employed. In this method, an epoxy resin blend of interest held within a cold pressurized tank is injected into a heated mold through a pipeline and a die head, while the mold is pressurized to compensate for any contraction of the resin being cured, thereby producing the desired casting within a shortened period of curing. The epoxy resin blend employed in this method must have a low viscosity and a long pot life within the cold pressurized tank, and must be capable of curing rapidly within the heated mold.

Those epoxy resins which exhibit low viscosities at low temperatures have low molecular weights and, hence, they exhibit on extremely high degree of shrinkage during curing and are highly likely to give cured products with sink marks and cracks. This problem is particularly serious with cycloaliphatic epoxy resins which are commonly employed for the purpose of providing improved heat resistance. In addition, epoxy resins that are highly reactive at elevated temperatures will also exhibit comparatively high reactivity at low temperatures and suffer from a shorter pot life. Common practice for dealing with these problems is to employ the superatmospheric gelling method with a view to preventing the occurrence of sink marks and cracks during the curing process and to use a latent accelerator for the purpose of extending the pot life of the resin blend. A problem arises, however, from the fact that epoxy resins of low molecular weights, such as cycloaliphatic epoxy resins, that will exhibit low viscosities at low temperatures are less resistant to thermal shock than the solid epoxy resins which are commonly employed in ordinary casting methods other than the superatmospheric gelling process.

One conventional method employed for improving the resistance of low-viscosity epoxy resins to thermal shock is to use them in combination with bisphenol A type epoxy resins, but the intended resistance to thermal shock cannot be attained without adding a large amount of bisphenol A type epoxy resin. Furthermore, the resulting epoxy resin composition has an excessively high viscosity at low temperatures and presents considerable difficulty in working operations at low temperatures. An alternative to the use of bisphenol A type epoxy resins is to add plasticity providing agents, such as high-molecular weight oligomers that has molecular weights within the range of from about 500 to 5,000 and which are comprised of polyester, polyether, polybutadiene or the like in the backbone chain. However, as the addition of these oligomers in increased, the viscosity of the epoxy resin is increased significantly while its heat resistance is considerably reduced. On the other hand, if the addition of such oligomers is insufficient, there is little possibility of improvement in the resistance of the produce against thermal shock. Plasticity providing agents such as those having polyamide in the backbone chain have the advantage that they will not substantially increase the viscosity of the resin blend but then, the resin blend incorporating such plasticity providing agent is highly reactive and has a shorter pot life.

In the superatmospheric gelling method, an epoxy resin blend having a low viscosity at low temperature is injected into a mold that is heated to a temperature higher than that of the resin blend. Within the mold, the viscosity of the resin blend is reduced temporarily to cause precipitation of the filler, giving rise to such problems as surface defects (e.g. flow marks) on the cured product and an appreciably high degree of unevenness in the distribution of filler's level in the cured product. This latter problem causes nonuniformity in the dielectric constant of the cured product and an insulator made of that product will have an unequal potential distribution in its cross section. An electric machine using this insulator will not only suffer from such electrical problems as reduced a.c. breakdown voltage but also has degraded mechanical properties such as low crack resistance.

In ordinary casting methods other than the superatmospheric gelling process, the above-mentioned problems have hitherto been coped with by using an increased amount of filler or reducing its particle size so that the overall viscosity of the epoxy resin composition is sufficiently increased to prevent precipitation of the filler. However, this method is unable to produce a resin blend having a low viscosity at low temperature, and most of the problems associated with the drop in the viscosity of the resin blend that results from its injection into a mold having a higher temperature remain unsolved.

As explained above, the conventional epoxy resins are unable to have high resistance to both heat and thermal shock. In addition, when an epoxy resin blend having a low viscosity at low temperature is injected into a mold heated to a temperature higher than that of the blend, the filler will precipitate to cause not only surface flaws on the cured product but also nonuniformity or degradation in the properties of the final product.

SUMMARY OF THE INVENTION

The primary object, therefore, of the present invention is to eliminate the aforementioned problems by providing a novel epoxy resin composition that has a low viscosity and long pot life at low temperatures while retaining rapidly curing properties at high temperatures and exhibiting high resistance to thermal shock without sacrificing its heat resistance and which will not cause precipitation of any portion of the filler in the resin composition.

BRIEF DESCRIPTION OF THE DRAWING

The accompanying drawing is a diagram showing the relationship between time and the viscosity at 60° C. of each of the epoxy resin compositions prepared in Examples 1 to 3 and Comparative Examples 1 to 4.

DETAILED DESCRIPTION OF THE INVENTION

Figure 1:
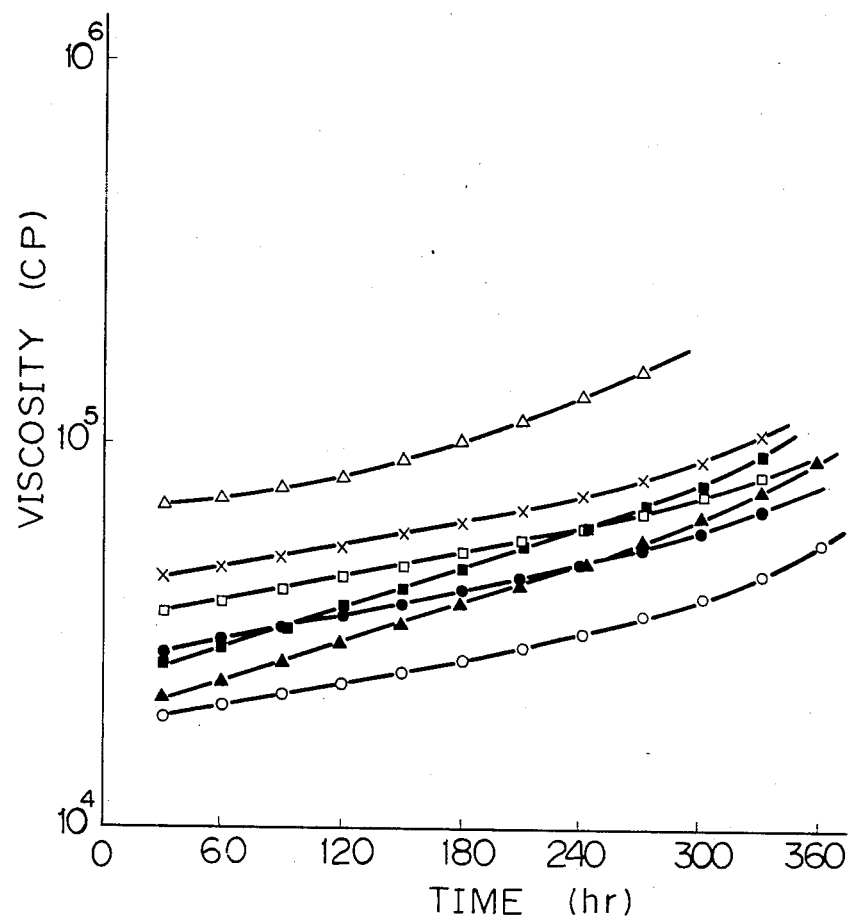

The epoxy resin composition of the present invention comprising an epoxy resin (A) prepared by mixing a cyclic epoxide type epoxy resin having an epoxy equivalent of 200 or below with a phenoxy resin having a molecular weight of approximately 30,000; a curing agent made of a mixture of a polybasic carboxylic acid anhydride and an aromatic ester; and a filler made of an inorganic powder.

The cyclic epoxide type epoxy resin as one component of the mixture (A) may be 3,4-epoxycyclohexylmethyl-(3,4-epoxy)cyclohexanecarboxylate, and this may be mixed with 10–50% of its own weight of a phenoxy resin.

The aromatic ester as one component of the curing agent may be a diester of Formula (I)

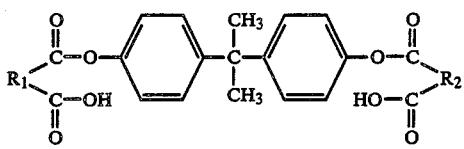

wherein $R_1$ and $R_2$ are each a saturated or unsaturated cyclic hydrocarbon group having 6–8 carbon atoms.

The diester of Formula (I) may be added in an amount of 0.05–0.3 mole per mole of the polybasic carboxylic acid anhydride which is the other component of the curing agent.

Almost all of the commercial cyclic epoxide type epoxy resins having an epoxy equivalent of 200 or below may be used in the present invention, but epoxy dicyclopentenylphenylglycidyl ether and dicycloaliphatic diether diepoxy are unsuitable since their viscosities are very high and mixtures with a phenoxy resin have such high viscosities that working at low temperatures (20°–80° C.) will become either very difficult or entirely impossible. If the cyclic epoxide type epoxy resin has a very low molecular weight, an increased amount of curing agent has to be used in order to cause the desired degree of curing in the resin blend. Therefore, cyclic epoxide type epoxy resins that are advantageous for use in the present invention are those having an epoxy equivalent of 200 or below and a viscosity of no higher than 1,000 cp at 25° C. Among the compounds that satisfy these requirements, those having a molecular structure of the same type as that of 3,4-epoxycyclohexylmethyl-(3,4-epoxy)cyclohexanecarboxylate are particularly preferable.

The phenoxy resin is preferably added in an amount of 10–50% by weight of the cyclic epoxide type epoxy resin. If less that 10 wt% of the phenoxy resin is used, the resulting resin blend is such that it cannot be injected into a mold having a higher temperature without causing precipitation of the filler since the decrease in the viscosity of the resin blend will be as great as in the case where only the cyclic epoxide epoxy resin is used as the resin component. If, on the other hand, more than 50 wt% of the phenoxy resin is used, the resin blend will have such a high viscosity that considerable difficulty is involved in working the blend at low temperatures.

Any polybasic carboxylic acid anhydride that is liquid at low temperatures (20°–80° C.) may be employed as one component of the curing agent, and suitable examples are hexahydrophthalic acid anhydride, methylhexahydrophthalic acid anhydride, tetrahydrophthalic acid anhydride, and methyltetrahydrophthalic acid anhydride, and these may be used either independently or in combination.

The aromatic ester used as the other component of the curing agent may be any compound of Formula (I) where $R_1$ and $R_2$ are each a saturated or unsaturated cyclic hydrocarbon group having 6–8 carbon atoms, and illustrative aromatic rings include cyclohexane, methyl-substituted cyclohexane, benzene, cyclohexene and methyl-substituted cyclohexene rings.

The aromatic ester is advantageously added in an amount of 0.05–0.3 mole per mole of the polybasic carboxylic acid anhydride. If less than 0.05 mole of the aromatic ester is used, the curing agent is no more effective than one composed of only the polycarboxylic acid anhydride and the cured resin blend will have an undesirably low resistance to thermal shock. If, on the other hand, more than 0.3 mole of the aromatic ester is used, a cured product having improved resistance to thermal shock is obtained but, then, it will not have a high value of HDT (deflection temperature under flexural load).

An inorganic powder material that will not deteriorate the electrical or mechanical properties of the blend may be used as a filler in the present invention. Suitable, but by no means limiting, examples are alumina, hydrated alumina, quartz and fused quartz powders.

The epoxy resin composition of the present invention may be prepared and cast by the following procedures: the cyclic epoxide type epoxy resin having an epoxy equivalent of 200 or below is mixed with the phenoxy resin having a molecular weight of approximately 30,000 to form a mixture (A); this mixture is blended with the curing agent made of the polybasic carboxylic acid anhydride and the aromatic ester, the inorganic filler powder, and a suitable accelerator (if desired) at 20°–80° C., preferably under subatmospheric pressure, thereby making the epoxy resin composition; the composition then is injected directly into a preheated mold (90°–160° C.) through a pipeline; the mold is subsequently pressurized at 0.5–5.0 kg/cm$^2$G for 1–30 minutes until curing of the composition is completed to produce a casting.

The accelerator that may be incorporated in the epoxy resin composition is illustrated by, but by no means limited to, metal salts of organic carboxylic acids (e.g. zinc octylate), tertiary amines, boron trifluoride-amine complex, and imidazole. The amount of the accelerator added is to be adjusted to such a value that curing of the blend will be completed in 1–30 minutes at the mold temperature of 90°–160° C.

The epoxy resin composition offered by the present invention may also contain a colorant, a coupling agent or an internal release agent on the condition that they will not deteriorate any of the desirable characteristics such as the viscosity, long pot life, and fast curing property of the resin blend, as well as the resistance to precipitation of the filler, absence of color unevenness, high HDT and thermal shock resistance of the cured product of the resin blend.

The following Examples and Comparative Examples are provided for the purpose of further illustrating the composition of the present invention. In the examples and comparatives, all parts were based on weight.

EXAMPLE 1

A hundred parts of a mixture of a cyclic epoxide type epoxy resin (CY-179 of Ciba Geigy) and 15 wt% of a phenoxy resin (PKHH of UCC), 74 parts of methyl-THPA (acid anhydride), 12 parts of a methyl tetrahydrophthalic acid diester of bisphenol A, 1 part of zinc octylate and 440 parts of an alumina powder were agitated at 60° C. under vacuum so as to prepare an epoxy resin composition. The initial viscosity of the resin composition, its pot life, gelling time and time vs. viscosity profile were determined by the following methods. The results are summarized in the following Table 1 and the accompanying FIGURE (—•—).

Three test pieces were prepared from the resin composition by first gelling it at 150° C. and by then curing at 130° C.×24 hours. These test pieces were used in evaluation of crack resistance, HDT and filler precipitation, respectively, by the methods shown below. The results of evaluation are also summarized in Table 1.

Initial viscosity

The epoxy resin composition was agitated under vacuum at 60° C. for 30 minutes and its viscosity was measured.

Pot life

The viscosity of the epoxy resin composition was measured at 60° C. and at intervals of 30 minutes. The time required for the viscosity to increase to $10^5$ cp was measured.

Gelling time

The epoxy resin composition was heated in a hot-air drying oven held at 150° C. and the time required for the resin composition to gel was measured.

Time vs. viscosity profile

The epoxy resin composition was put in a vessel held at 60° C. and the vessel was placed in an oil bath also held at 60° C. Viscosity measurements were done at 30-minute intervals for plotting the time-dependent variations in viscosity.

Crack index

A test piece of the epoxy resin composition was examined for its crack resistance by the method recommended by the IEC in IEC Publication 455-2.

HDT

A test piece was prepared from the epoxy resin composition and evaluated in accordance with ASTM-D 648.

Filler precipitation

A test piece having an outside diameter of 20 mm and a height of 200 mm was cured from the epoxy resin composition and the concentration of the filler in the top 5-mm portion of the sample was measured. The amount of filler precipitation was determined by substracting the measured value of filling from the initial value.

TABLE 1

| | Resin composition | | | Cured product | | |
|---|---|---|---|---|---|---|
| Run No. | initial viscosity (cp) | pot life (hr) | gelling time (min) | HDT (°C.) | crack index | filler precipitation (wt %) |
| Ex. 1 | 19500 | >360 | 19 | 141 | 6.8 | 2.0 |
| Ex. 2 | 29000 | >360 | 20 | 140 | 7.0 | 1.1 |
| Ex. 3 | 37000 | 355 | 22 | 140 | 7.3 | 0.6 |
| Comp. Ex. | | | | | | |
| 1 | 27000 | 330 | 18 | 145 | 4.0 | 21.5 |
| 2 | 69000 | 165 | 30 | 132 | 6.9 | 0.6 |
| 3 | 22000 | 360 | 25 | 140 | 3.5 | 1.7 |
| 4 | 45000 | 310 | 28 | 130 | 6.6 | 1.2 |

EXAMPLE 2

A hundred parts of a mixture of a cyclic epoxide type epoxy resin (CY-179) and 30 wt% of a phenoxy resin, 55 parts of methyl-THPA, 28 parts of a methyl tetrahydrophthalic acid diester of bisphenol A, 1 part of zinc octylate and 430 parts of an alumina powder were agitated under vacuum to prepare an epoxy resin composition. The characteristics of this composition and the cured product thereof were evaluated as in Example 1. The results are summarized in Table 1 and the accompanying figure (—▼—).

EXAMPLE 3

A hundred parts of a cyclic epoxide type epoxy resin (CY-179) and 45 wt% of a phenoxy resin, 40 parts of methyl-THPA, 41 parts of a methyl tetrahydrophthalic acid diester of bisphenol A, 1 part of zinc octylate and 425 parts of an alumina powder were agitated under vacuum to prepare an epoxy resin composition. The characteristics of this composition and the cured product thereof were evaluated as in Example 1. The results are summarized in Table 1 and the accompanying FIGURE (—□—).

COMPARATIVE EXAMPLE 1

A hundred parts of a mixture of a cyclic epoxide type epoxy resin (CY-179) and 6 wt% of a phenoxy resin, 66 parts of methyl-THPA, 34 parts of a methyl tetrahydrophthalic acid diester of bisphenol A, 1 part of zinc octylate and 470 parts of an alumina powder were agitated at 60° C. under vacuum so as to prepare an epoxy resin composition. The characteristics of this composition and the cured product thereof were evaluated as in Example 1. The results are summarized in Table 1 and the accompanying FIGURE (—■—).

COMPARATIVE EXAMPLE 2

A hundred parts of a mixture of a cyclic epoxide type epoxy resin (CY-179) and 60 wt% of a phenoxy resin, 46 parts of methyl-THPA, 23 parts of a methyl tetrahydrophthalic acid diester of bisphenol A, 1 part of zinc octylate and 400 parts of an alumina powder were agitated at 60° C. under vacuum so as to prepare an epoxy resin composition. The characteristics of this composition and the cured product thereof were evaluated as in Example 1. The results are summarized in Table 1 and the accompanying FIGURE (—△—).

COMPARATIVE EXAMPLE 3

A hundred parts of a mixture of a cyclic epoxide type epoxy resin (CY-179) and 30 wt% of a phenoxy resin, 70 parts of methyl-THPA, 2 parts of a methyl tetrahydrophthalic acid diester of bisphenol A, 1 part of zinc octylate and 400 parts of an alumina powder were agitated at 60° C. under vacuum so as to prepare an epoxy resin composition. The characteristics of this composition and the cured product thereof were evaluated as in Example 1. The results are summarized in Table 1 and the accompanying FIGURE (—▲—).

COMPARATIVE EXAMPLE 4

A hundred parts of a mixture of a cyclic epoxide type epoxy resin (CY-179) and 30 wt% of a phenoxy resin, 40 parts of methyl-THPA, 54 parts of a methyl tetrahydrophthalic acid diester of bisphenol A, 1 part of zinc octylate and 455 parts of an alumina powder were agitated under vacuum at 60° C. so as to prepare an epoxy resin composition. The characteristics of this composition and the cured product thereof were evaluated as in Example 1. The results are summarized in Table 1 and the accompanying FIGURE (—X—).

In Examples 1 to 3 and Comparative Examples 1 to 4, the filler occupied about 70% by weight of the epoxy resin composition, and the amount of the curing agent used per equivalent of the epoxy resin was 0.8.

As will be understood from the data shown above, the epoxy resin composition of the present invention will provide a cast insulator that has high resistance to both heat (as evidenced by high HDT values) and thermal shock and which also exhibits a uniform dispersion of filler. In addition, the composition will ensure efficient production of cast insulators with consistent quality. Minimum loss of the resin during casting operations will also provide for substantial saving of the resources.

I claim:

1. An epoxy resin composition comprising an epoxy resin which is a mixture (A) of an epoxy resin having an epoxy equivalent of 200 or below and a phenoxy resin having a molecular weight of approximately 30,000, a curing agent which is made of a polybasic carboxylic acid anhydride and an aromatic ester, and an inorganic filler powder, wherein the epoxy resin in the mixture (A) is 3,4-epoxycyclohexylmethyl-(3,4-epoxy)cyclohexanecarboxylate and wherein the aromatic ester is a diester of Formula (I):

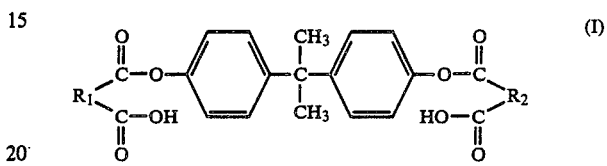

wherein $R_1$ and $R_2$ are each a saturated or unsaturated cyclic hydrocarbon group having 6–8 carbon atoms.

2. An epoxy resin composition according to claim 1 wherein the phenoxy resin in said mixture (A) is present in an amount of 10–50 wt% of the expoxy resin.

3. An epoxy resin composition according to claim 1 wherein the aromatic ester as one component of the curing agent is present in an amount of 0.05–0.3 mole per mole of the polybasic carboxylic acid anhydride.

* * * * *